US012576357B2

(12) United States Patent
Ruhland et al.

(10) Patent No.: US 12,576,357 B2
(45) Date of Patent: Mar. 17, 2026

(54) FILTER HOUSING OF A FILTER FOR A FLUID AND FILTER

(71) Applicant: MANN+HUMMEL GmbH, Ludwigsburg (DE)

(72) Inventors: Klaus-Dieter Ruhland, Meckenheim (DE); Michael Kaufmann, Meckenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 663 days.

(21) Appl. No.: 17/862,298

(22) Filed: Jul. 11, 2022

(65) Prior Publication Data

US 2022/0347617 A1      Nov. 3, 2022

Related U.S. Application Data

(63) Continuation of application No. PCT/EP2020/086761, filed on Dec. 17, 2020.

(51) Int. Cl.
*B01D 46/42*      (2006.01)
*B01D 46/00*      (2022.01)

(52) U.S. Cl.
CPC ..... *B01D 46/4227* (2013.01); *B01D 46/0004* (2013.01); *B01D 2265/027* (2013.01); *B01D 2265/028* (2013.01); *B01D 2271/02* (2013.01); *B01D 2279/60* (2013.01)

(58) Field of Classification Search
CPC ........... B01D 46/0004; B01D 46/4227; B01D 2265/027; B01D 2265/028; B01D 2271/02; B01D 2279/60

USPC ..... 55/385.3, 497, 498, 502, 504; 123/198 E
See application file for complete search history.

(56) References Cited

U.S. PATENT DOCUMENTS

| | | | |
|---|---|---|---|
| 4,213,643 A | 7/1980 | Blind et al. | |
| 4,965,914 A | 10/1990 | Confer et al. | |
| 5,480,197 A | 1/1996 | Ernst et al. | |
| 6,306,192 B1 * | 10/2001 | Greif .................. | B01D 46/0084 |
| | | | 55/497 |
| 6,402,798 B1 * | 6/2002 | Kallsen .................. | B01D 46/24 |
| | | | 55/504 |
| 9,567,949 B2 * | 2/2017 | Desnoe ................ | B01D 46/521 |
| 10,029,198 B2 * | 7/2018 | Adamek ........... | B01D 46/0004 |

(Continued)

FOREIGN PATENT DOCUMENTS

| | | |
|---|---|---|
| DE | 3429635 A1 | 2/1986 |
| DE | 202008014053 U1 | 3/2010 |

*Primary Examiner* — In Suk C Bullock

(57) ABSTRACT

A filter housing includes a housing body having an openable installation opening and a housing cover to close the installation opening, and a fastening and/or locking device to secure the housing cover in a closed position. The housing body includes an element receptacle to receive a filter element through the installation opening. The fastening and/or locking device has a U-shaped bracket element with arm sections connected to a cross beam and an eccentric element mounted rotatable on the cross beam. The bracket element pivots with respect to a bracket pivot axis such that the cross beam with the eccentric element is pivotable on a side of the housing body with the installation opening. In the closed position the eccentric element engages with the housing cover and the bracket element grips the housing cover such that a part of the housing cover is between the arm sections of the bracket element.

12 Claims, 11 Drawing Sheets

(56)                     References Cited

U.S. PATENT DOCUMENTS

| 10,668,418 | B2 * | 6/2020 | Kong ................... F24F 1/0073 |
| 10,688,428 | B2 * | 6/2020 | Albertini ............ B01D 46/2411 |
| 10,799,823 | B2 * | 10/2020 | Kaufmann ......... B01D 46/0004 |
| 11,572,854 | B2 * | 2/2023 | Finn ................. F02M 35/02416 |
| 2010/0024371 | A1 * | 2/2010 | Rieger ................. B01D 46/527 |
| | | | 55/498 |
| 2015/0107200 | A1 | 4/2015 | Menssen et al. |
| 2018/0339254 | A1 * | 11/2018 | Kaufmann ......... B01D 46/0005 |

* cited by examiner

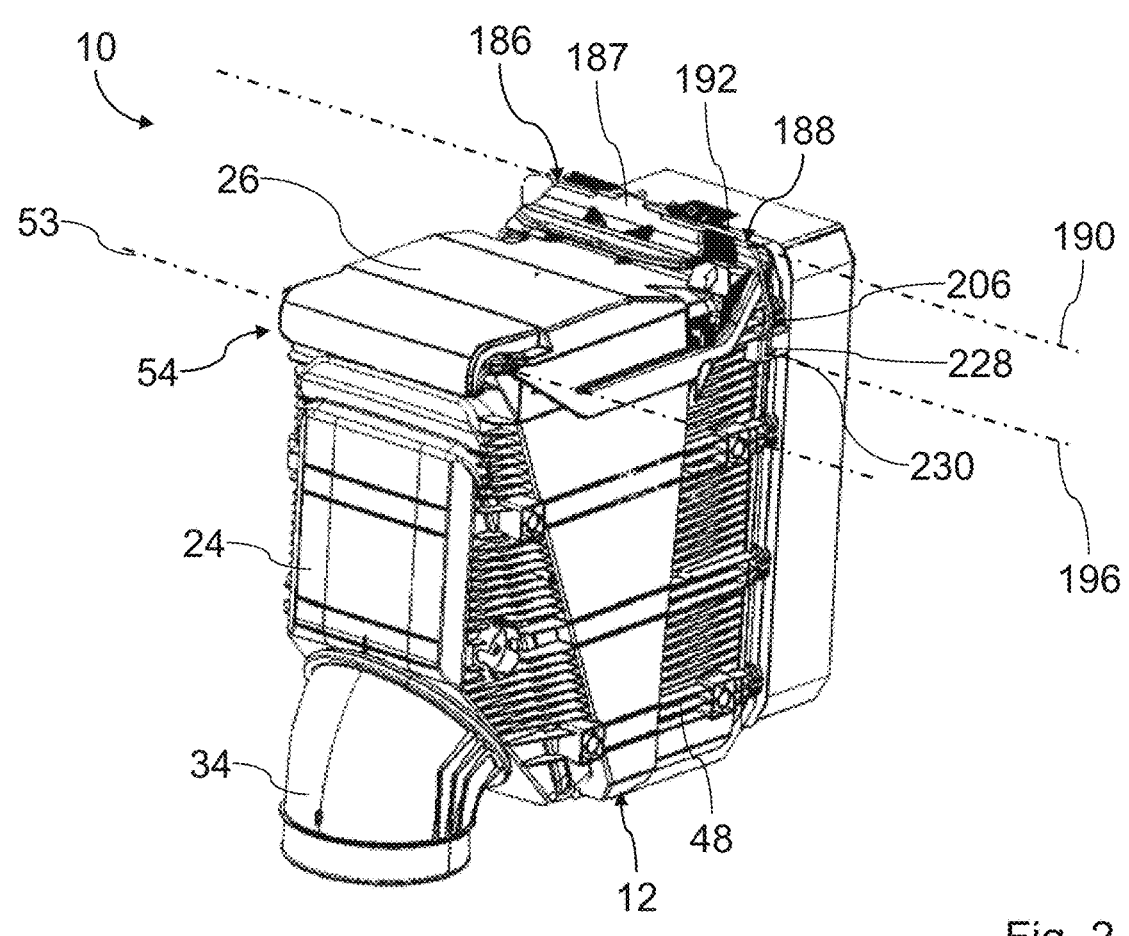
_Fig. 2_
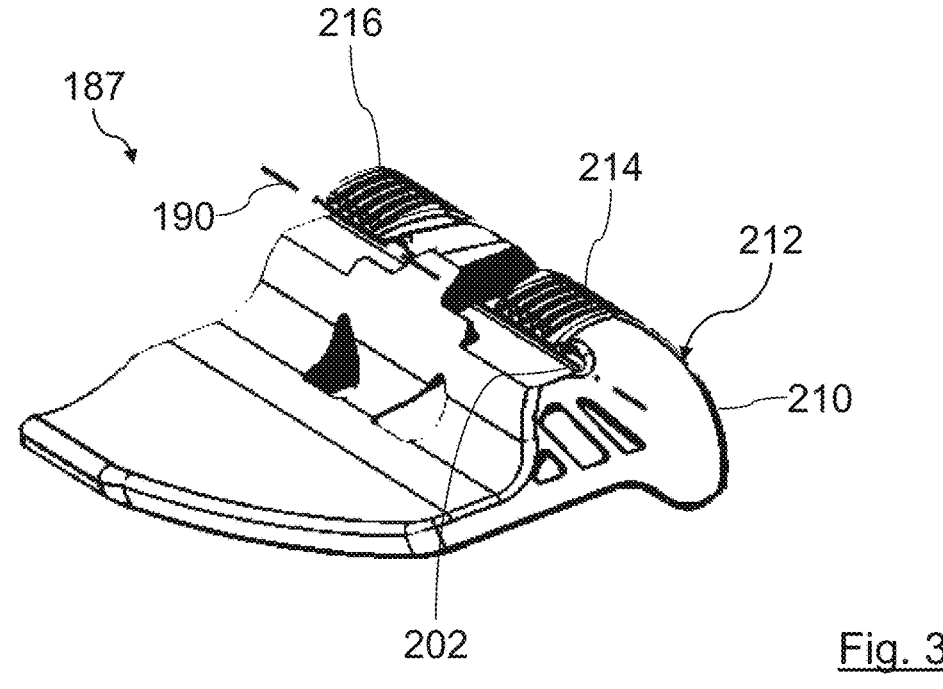
_Fig. 3_

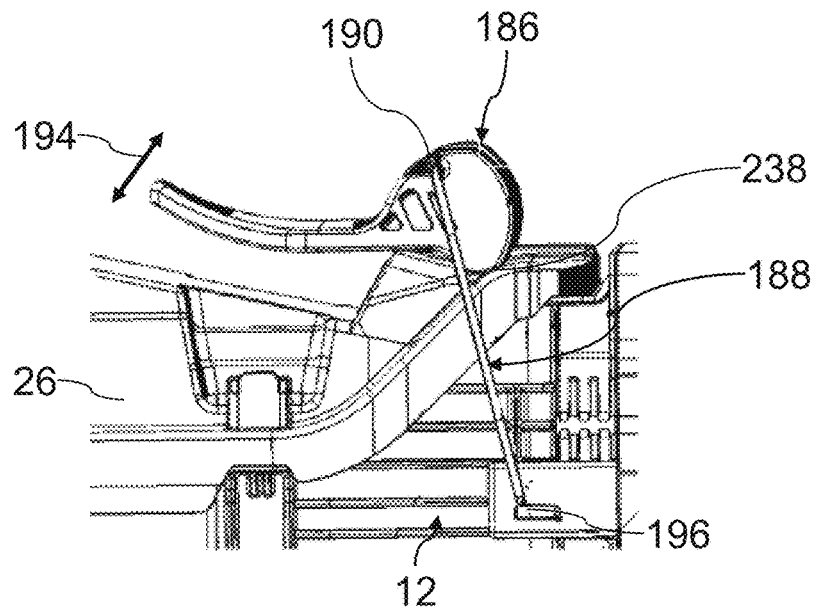
<u>Fig. 6</u>
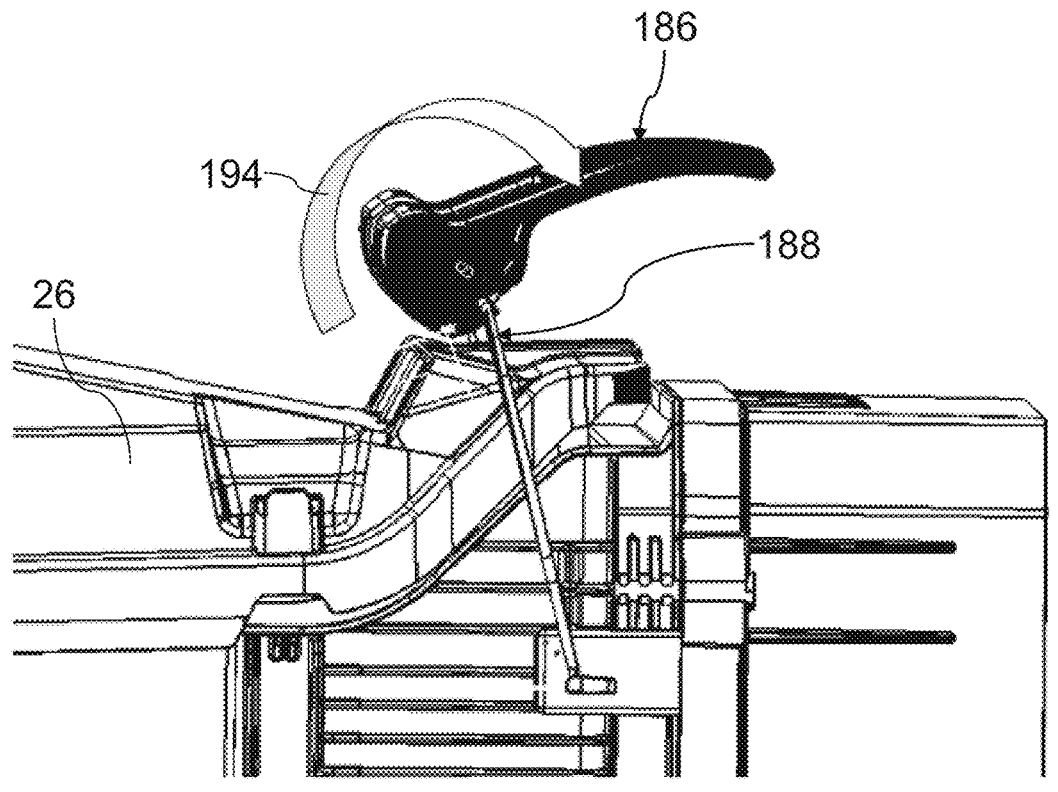
<u>Fig. 7</u>

10    10    10
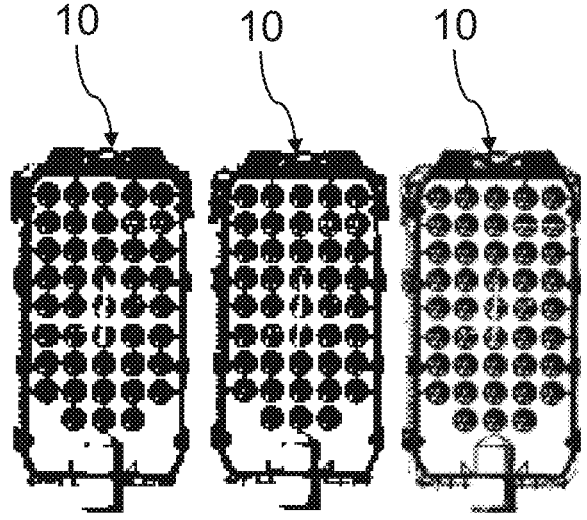
_Fig. 19_
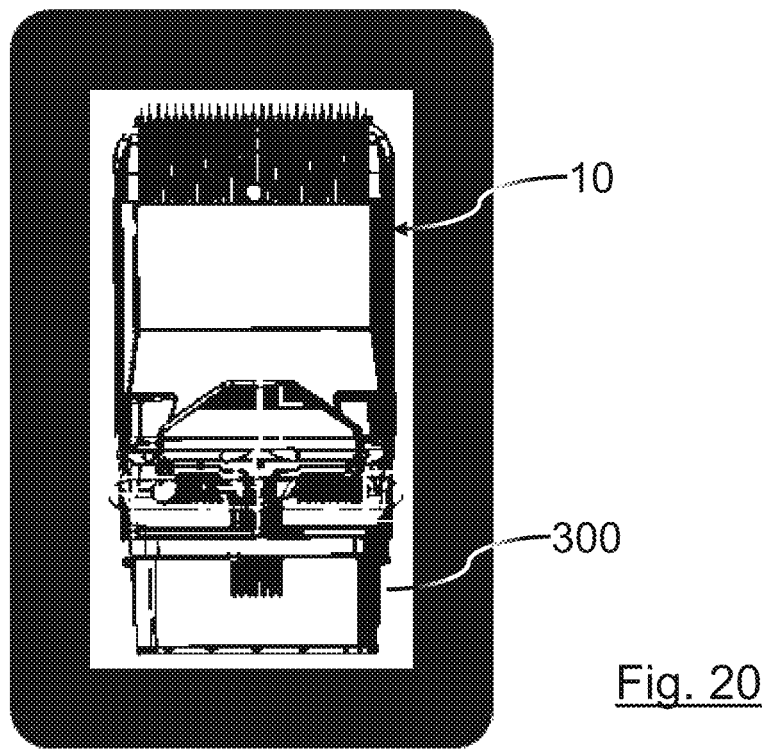
_Fig. 20_

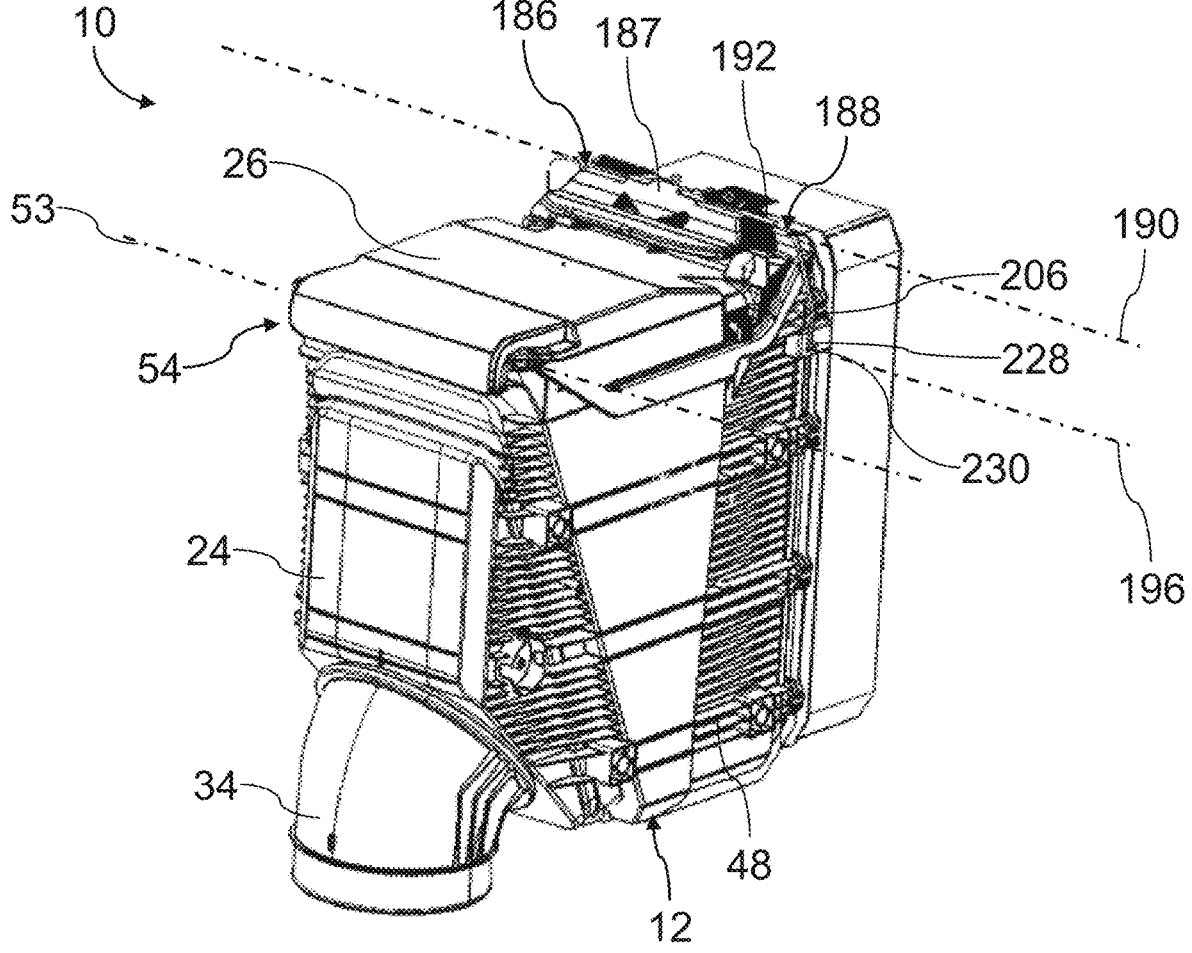

FILTER HOUSING OF A FILTER FOR A FLUID AND FILTER

TECHNICAL FIELD

The invention relates a filter housing of a filter for a fluid, the filter housing comprising a housing body, which is comprising at least one openable installation opening, at least one inlet opening for fluid to be cleaned, and at least one outlet opening for cleaned fluid, at least one housing cover, which is configured to close off the at least one openable installation opening, and at least one fastening and/or locking device, which is configured to secure the at least one housing cover in its closed position in the housing body, wherein the housing body comprising an element receptacle configured to receive, through the at least one openable installation opening in an installation direction which extends parallel or coaxially to an installation axis of the filter housing, at least one filter element, wherein the at least one filter element, when installed in the element receptacle, separates the at least one inlet opening from the at least one outlet opening, wherein the at least one openable installation opening is arranged in a transverse side of the housing body and the transverse side is lateral relative to a housing axis of the filter housing, wherein the housing body comprising at least one sealing surface for contact of at least one seal of the at least one filter element, wherein the at least one sealing surface surrounds the housing axis at least partially circumferentially.

Further the invention relates to a filter for a fluid, which comprises a filter housing, in which at least one filter element is arranged exchangeable.

STATE OF TECHNOLOGY

The US 2018/0339254 A1 discloses a fluid filter has a filter housing with inlet opening for fluid to be cleaned and outlet opening for cleaned fluid. A filter element arranged in an element receptacle of the filter housing separates inlet opening from outlet opening. The filter housing has a housing body with an installation opening to the element receptacle, through which the filter element in an installation direction is introduced into the element receptacle. The filter housing has a housing cover for closing the installation opening. The installation opening is arranged in a transverse side of the housing body that is lateral relative to the housing axis. The filter housing has a sealing surface, surrounding the housing axis at least partially circumferentially, for contacting a seal of the filter element. The filter element has a seal support device for the seal and the filter housing has a pressing device for the seal support device. The at least one housing cover can be secured in its closed position on the housing body by means of a fastening and/or locking device, in particular at least one clamping fastener and/or at least one clasp.

The invention has the objective to configure a filter housing in which an installation of the filter element into the filter housing and/or demounting of the filter element from the filter housing can be improved, in particular simplified.

DISCLOSURE OF INVENTION

This objective is solved for the filter housing in accordance with the invention by that at least one fastening and/or locking device has at least one U-shaped bracket element, whose arm sections are connected to a cross beam, and at least one eccentric element which is mounted rotatable with respect to a rotation axis on the cross beam, wherein the free ends of the arm sections of the at least one bracket element each are connected to at least one corresponding bracket reception on opposite sides of the housing body such, that the at least one bracket element can pivot with respect to a bracket pivot axis such, that the cross beam with the at least one eccentric element is pivotable on the side of the housing body with the at least one installation opening, wherein in a closed position the at least one eccentric element is engaged with the at least one housing cover and the at least one bracket element grips around the housing cover such, that a part of the housing cover is located between the arm sections of the bracket element.

According to the invention, the installation opening of the housing body can be closed by at least one housing cover. For securing the at least one housing cover in its closed position at least one fastening and/or locking device has at least one U-shaped bracket element and at least one eccentric element. The at least one eccentric element is mounted pivotally on the cross beam of the at least one bracket element. The at least one bracket element is pivotable connected to the housing body such, that it can grip around the at least one housing cover in its closed position. By pivoting the bracket element, the at least one eccentric element is engaged with the at least one housing cover. With the eccentric element, a force increasing with the movement is applied to fix and lock the at least one housing cover. Since the bracket element is gripping around the at least one housing cover the force can be applied more evenly compared with the two fastening and locking devices placed on the filter housing known from the prior art. Further, the inventive fasting and/or locking device can be operated with one hand.

Advantageously, the filter housing can be designed for a filter for in particular gaseous fluid, in particular air, in particular of an internal combustion engine, in particular of a motor vehicle, comprises at least one inlet opening for fluid to be cleaned and at least one outlet opening for cleaned fluid. The filter housing comprises at least one housing cover with which an openable installation opening can be closed off. The at least one installation opening is arranged in a transverse side of the housing body that is lateral relative to the housing axis. Further, the filter housing can comprise at least one pressing device configured to act on a seal support device of the at least one filter element.

In addition, the invention concerns a filter for in particular gaseous fluid, in particular air, in particular of an internal combustion engine, in particular of a motor vehicle, with at least one filter housing in which at least one filter element is arranged.

The invention can be used in motor vehicles, construction/agricultural machines, compressors, industrial motors or other devices with internal combustion engines.

Vehicles in the meaning of the invention can be land craft, watercraft and/or aircraft.

Advantageously, the motor vehicle can be a passenger car, a truck, a motorcycle, an autobus, a tractor, an agricultural vehicle and/or a construction vehicle or the like.

The invention can advantageously be part of an air intake manifold of an internal combustion engine. The filter can serve for cleaning combustion air to be supplied to the internal combustion engine. The invention is however not limited to an air filter of an air intake manifold of an internal combustion engine of a motor vehicle. Instead, it can also be used for other types of air systems of motor vehicles or other machines, in particular agricultural machines or construction machines. The air filter can also be used outside of the automotive field, in particular in industrial motors.

In other respects, the features and advantages which have been disclosed in connection with the filter element according to the invention, the element frame according to the invention, the filter bellows according to the invention, the filter housing according to the invention, and the filter according to the invention, and their respective advantageous embodiments apply correspondingly among each other, and vice versa. The individual features and advantages can, of course, be combined among each other, wherein further advantageous effects may result which go beyond the sum of the individual effects.

According to a favorable embodiment, the at least one bracket element can be at least partly elastic. In this way, the at least one bracket element can adapt its form dependent on the input of forces during closing and/or opening the at least one fastening and/or locking device.

Advantageously, the at least one bracket element can be a spring element. With a spring element and elastic bracket element can be realized.

Advantageously, the at least one bracket element can be at least partly of metal, plastic and/or composite material or such like. In this way, the at least one bracket element can be realized the and elastically.

Advantageously, the at least one bracket element can be an elastic wire. In this way, the at least one bracket element can easily be realized by bending an elastic wire.

According to another favorable embodiment, the at least one eccentric element can comprise at least one lever arm, at least one cross beam mounting section and at least one eccentric section. With at least one lever arm can be used a handle to actuate the at least one fastening and/or locking device with less effort. With at least one transverse connecting mounting section the eccentric element can be connected to the cross beam of the at least one U-shaped bracket element. By rotating the at least one eccentric section on the cross beam of the at least one bracket element an increasing closing force can be applied.

Advantageously, at least one transverse connecting mounting section of at least one eccentric element can comprise at least one U-shaped opening.

According to another favorable embodiment, at least one eccentric section of at least one eccentric element can comprise at least one sliding area. With the at least one sliding area, the at least one eccentric section can slide along a corresponding area on side of the at least one housing cover.

Advantageously, the at least one sliding area can comprise a number of ribs. In this way a mechanical friction between the at least one sliding area and the at least one corresponding area on the side of the at least one housing cover can be reduced.

According to another favorable embodiment, at least one eccentric section of at least one eccentric element can comprise at least one snap-in area. The at least one snap-in area can be latched in a closed position with a corresponding element on the side of the housing cover.

Advantageously, at least one snap-in area can be arranged in closing rotating direction of the eccentric section at the end of at least one sliding area of the at least one eccentric section. In this way, the latching can be realized automatically by turning the at least one eccentric element into the closing position.

According to another favorable embodiment, the at least one housing cover can have at least one recess with which at least a part of the eccentric element can engage in the closing position. In this way, the eccentric element can be hold in a fixed closing position at the housing cover.

According to another favorable embodiment, the at least one fastening and/or locking device can comprise at least one retention member as loss protection between the at least one eccentric element and the at least one bracket element. In this way it can be prevented, that the at least one eccentric element and at least one bracket element can separate unintentionally.

Advantageously, at least one retention member can be arranged on opposite side of an U-shaped opening of the cross beam mounting section. In this way it can be prevented, that the cross beam of the bracket element can slip out of the cross beam mounting section of the eccentric element.

According to another favorable embodiment, the at least one fastening and/or locking device can comprise at least one shifting protection device between the at least one eccentric element and the at least one bracket element. In this way it can be prevented, that the at least one eccentric element and the at least one bracket element can shift relative to each other.

Advantageously, at least one shifting protection device can comprise at least one curved section of the cross beam of the bracket element. Advantageously, at least one shifting protection device can comprise at least one recess on the side of the eccentric element. At least one curved section on the side the cross beam of the bracket element can engage in a corresponding recess on the side of the eccentric element.

According to another favorable embodiment, the filter housing can comprise at least one lose prevention device between the fastening and/or locking device and the housing body. In this way it can be prevented, that the at least one fastening and/or locking device can detach from the housing unintentionally.

Advantageously, at least one part of at least one lose prevention device can be realized with at least one free end of at least one arm section of at least one bracket element such, that the at least one free end is bent at an angle to a bracket pivot axis of the at least one bracket element on the housing body. In this way, the at least one free end extends over the length of the bent part transverse to the bracket pivot axis.

Advantageously, at least one bracket reception of the housing body for at least one free end of at least one arm section of the at least one bracket element has an elongated insertion opening. In this way, a part of at least one free end of at least one arm section of at least one bracket element which is bent transverse to the bracket pivot axis can be inserted into or withdrawn from the insertion opening of the at least one bracket reception only if the bent part of the at least one end of the at least one arm is orientated parallel to the longitudinal direction of the elongated insertion opening. In other orientations of the at least one bracket element relative to the bracket reception the fastening and/or locking device is prevented against losing.

According to another favorable embodiment, the at least one housing cover is attached to the housing body with at least one pivot connection, wherein the pivot connection and the at least one fastening and/or locking device are on opposite sides of the at least one installation opening. In this way, the at least one housing cover can be pivoted for giving the installation opening free if the at least one fastening and/or locking device is in its opening position.

Advantageously, the at least one pivot connection can comprise at least one housing-body axis element on the side of the housing body. With at least one housing-body axis element a cover pivot axis of the at least one pivot connection can be realized.

Advantageously, the at least one pivot connection can comprise at least one U-shaped axle mounting element for at least one housing body axis element on the side of the housing cover. Through the opening of an U-shaped axle mounting elements a corresponding housing body axis element can be inserted and withdrawn.

Advantageously, an opening of the at least one U-shaped axle mounting element of at least one pivot connection can point to the side of the housing cover where the at least one fastening and/or locking device engages. In this way, and the closing position the cover pivot axis can be pulled farther into a corresponding U-shaped axle mounting element by pulling the whole housing cover with the at least one fastening and/or locking device.

According to another favorable embodiment, in a closed position a distance between the bracket pivot axis of the at least one bracket element on the housing body and a cover pivot axis of the pivot connection of the at least one housing cover on the housing body can be bigger than a distance between a force application area, in which the at least one fastening and/or locking device engages with the at least one housing cover and the cover pivot axis. In this way the at least one fastening and/or locking device can pull the closed housing cover into the pivot connection.

Further the objective is solved for the filter in accordance with the invention by that the filter comprises a filter housing according the invention.

In all other respects, the features and advantages shown in connection with the inventive housing and the inventive filter and their respective advantageous designs shall apply to each other accordingly and vice versa. The individual features and advantages can, of course, be combined with each other, whereby further advantageous effects can arise which are greater than the sum of the individual effects.

BRIEF DESCRIPTION OF DRAWINGS

The present invention together with the above-mentioned and other objects and advantages may best be understood from the following detailed description of the embodiments, but not restricted to the embodiments, wherein is shown schematically FIG. 1 a longitudinal section of an air filter with a filter housing in which exchangeably a filter element is arranged;

FIG. 2 a perspective view of the air filter from FIG. 1 showing the housing cover locked in place by a fastening and locking device comprising a bracket element and an eccentric element;

FIG. 3 an enlarged partial view of the eccentric element of the fastening and locking device from FIG. 2 and a rotation axis about which the eccentric element is rotatable on a cross beam of the bracket element;

FIG. 6 an enlarged side view of the air filter from FIGS. 1 and 2 in the area of a fastening and locking device;

FIG. 7 the enlarged side view of the air filter from FIG. 6, now the eccentric element rotating in the opening direction about the rotation axis into an opening position;

FIG. 19 an advantageous configuration where several air filters may therefore be mounted directly side by side, thereby providing a compact space-spacing configuration for applications requiring more than one air filter; and FIG. 20 an advantageous configuration in which the one handed operation of the fastening and locking device at the top of the housing cover permits air filter service from the top through a maintenance opening in a vehicle or machine.

Figure 1:
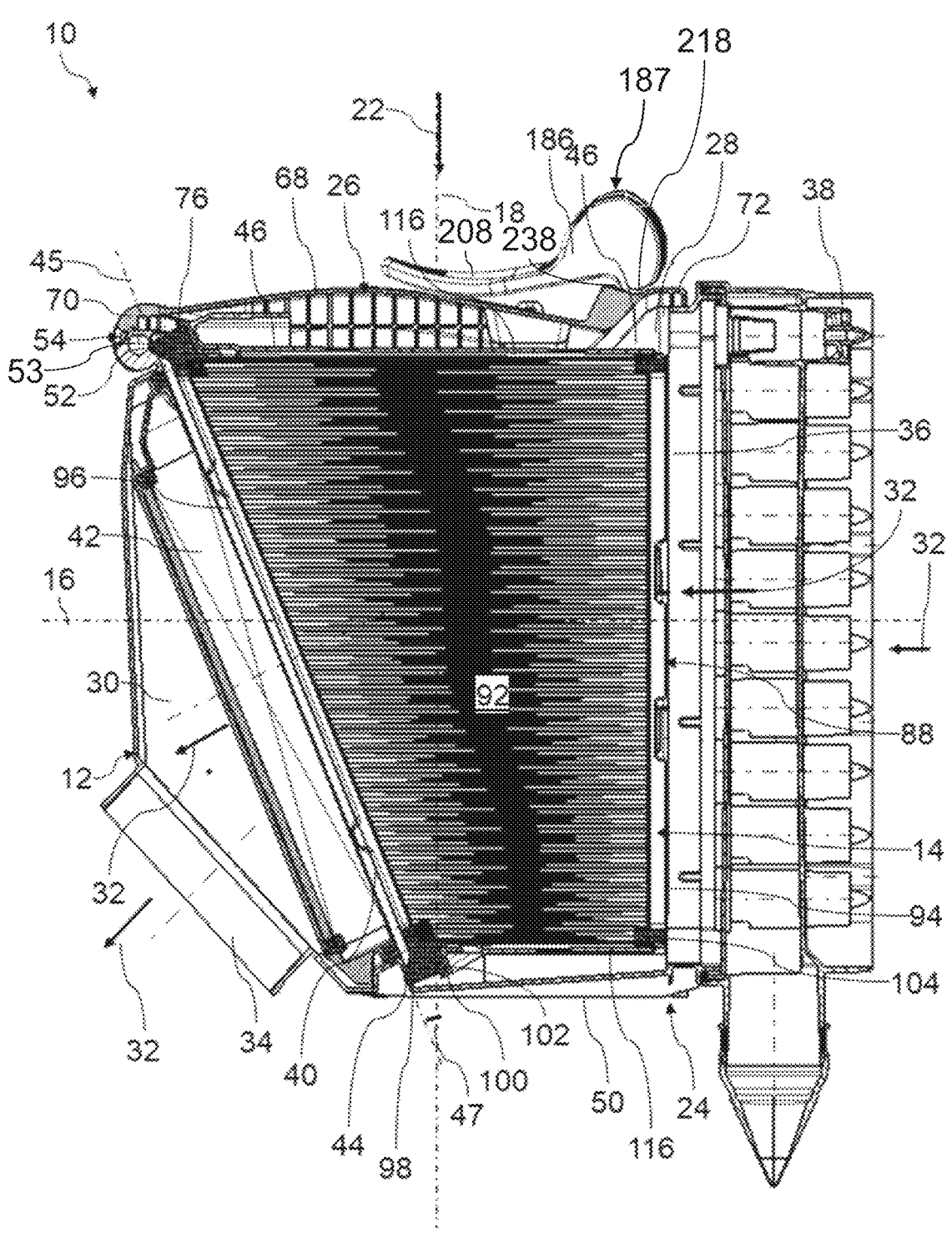

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

EMBODIMENT(S) OF INVENTION

In the FIGS. 1 to 20, an air filter 10 for cleaning air or, for example, an internal combustion engine, is illustrated. The air filter 10 is illustrated in different illustrations, sections, detail views, and assembly states. The air filter 10 may serve for cleaning the combustion air which is supplied to the internal combustion engine for combustion. The air filter 10 may serve for cleaning air for other application, for example, air supply to a fuel cell providing electric power.

The air filter 10 comprises an openable filter housing 12 in which exchangeably a filter element 14 is arranged.

For simplifying the explanation, in some of the figures an imaginary main axis 16 and an installation axis 18 are illustrated. In an exemplary fashion, the installation direction 22 extends coaxial to the installation axis 18. It is understood that some of the aforementioned axes and some of the aforementioned planes can also extend at a slant to each other in other embodiments of the invention.

In the mounted state of the air filter 10, the main axis 16 coincides with the element axis of the filter element 14 and the housing axis of the filter housing 12 in the illustrated embodiment. For simplifying the drawing, the reference character 16 is therefore used for the element axis and the housing axis, depending on the illustration. It is understood that the corresponding axis is referred to, respectively, in this context. The same holds true also for the installation axis 18.

The filter housing 12 is manufactured of plastic material. The filter housing 12 comprises a housing body 24 and a housing cover 26.

The housing body 24 comprises an element receptacle 28 for the filter element 14. An air outlet space 30 adjoins the element receptacle 28 downstream relative to the air flow through the air filter 10. The air flow into, through, and out of the air filter 10 is illustrated in the FIG. 1 by arrows 32.

An outlet socket 34 to which the air conduit of the intake manifold is connected adjoins the air outlet space 30. At the air inlet side, the receptacle 28 comprises an inlet opening 36. The inlet opening 36 extends across the entire inflow side of the air filter 10. It extends parallel to the flow center plane. Upstream of the inlet opening 36, a cyclone arrangement 38 as pre-separator for particles from the air is arranged.

At its outflow side, the element receptacle 28 has an outlet opening 40. The outlet opening 40 extends in a plane parallel to the transverse axis 20 and at a slant to the flow center plane, i.e., at a slant to the plane of the inlet opening 36.

The element receptacle 28, the outlet opening 40 and the inlet opening 36 each have a rectangular cross section, viewed in the direction of the main axis 16.

In the air outlet space 30, a secondary filter element 42 is optionally arranged. The secondary filter element 42 covers the outlet opening 40 completely.

The outlet opening 40 is surrounded by a housing-associated sealing surface 44. The housing-associated sealing surface 44 is facing the element receptacle 28. Relative to the main axis 16, it is continuous circumferentially. A sealing plane 45 of the housing-associated sealing surface 44 extends at a slant to the flow center plane by an angle 47 of approximately 20 degrees.

The transverse sides of the housing body 24 and of the filter element 14 extend on opposite sides of the transverse center plane in the embodiment. Correspondingly, the longitudinal sides of the housing body 24 of the filter element 14 are positioned on opposite sides of the longitudinal center plane. The longitudinal sides of the housing body 24 and of the filter element 14 extend each between the corresponding transverse sides and the inflow side and the outflow side.

At the longitudinal sides, the housing body 24 comprises closed longitudinal walls 48. In some of the figures, the respective forward longitudinal wall 48 of the housing body

24 may be shown at least partially cut away in order to enable a view of the interior of the filter housing 12.

At a rearward transverse side relative to the installation direction 22, the housing body 24 has an installation opening 46 for the filter element 14. At the transverse side that is positioned axially opposite thereto relative to the installation axis 18, the housing body 24 comprises a closed transverse wall 50.

The installation opening 46, viewed in installation direction 22, has an approximately rectangular cross section. Viewed in the installation direction 22 from the installation opening 46 toward the oppositely positioned transverse wall 50, the element receptacle 28 tapers in its expansion relative to the main axis 16. Viewed in the transverse direction of view in FIG. 1 which is perpendicular to axis 16 and axis 18, the element receptacle 28 has approximately the shape of a right angle trapezoid wherein the slanted leg of the trapezoid is facing the outlet opening 40.

At the exterior side of the housing body 24, adjacent to the installation opening 46, may include a bolt section 52 of a hinge-type pivot connection 54. The pivot connection 54 may serve for connecting the housing cover 26 with the housing body 24. The bolt section 52 is located at the side of the installation opening 26 which is facing the outflow side of the housing body 24. The bolt section 52 and thus the pivot axis 53 of the pivot connection 54 extend parallel to the transverse axis 20.

The bolt section 52 realizes a housing-body axis element of the pivot connection 54 on the side of the housing body 24. With the bold section 52 realizes the cover pivot axis 53 of the pivot connection 54.

The housing cover 26 comprises a closure section 68 which forms the transverse side of the housing cover 26. A rim of the closure section 68 extending circumferentially relative to the installation axis 18 extends complementary to a corresponding rim surrounding the installation opening 46 of the housing body 24. The closure section 68 is resting in the closing position of the housing cover 26 seal-tightly against the installation opening 46 and closes it off.

At the side which is facing the outflow side of the filter housing 12, the housing cover 26 may comprise a U-shaped axle mounting element form of sleeve section 70 which forms the cover-associated part of the pivot connection 54. The sleeve section 70 may extend parallel to the transverse axis 20. The sleeve section 70 may open at a circumferential side which is facing the inlet side of the filter housing 12 so that the sleeve section 70 for connecting the pivot connection 54 can be pushed onto the bolt section 52 in radial direction. Through the opening of the sleeve section 70 the bold section 52 can be inserted and withdrawn. The opening of the sleeve section 70 points to the side of the housing cover 26 where a fastening and locking device 186 engages. In the closing position, which is shown in FIGS. 1 and 2, the bold section 52 with the cover pivot axis 53 is pulled farther into the sleeve section 70 by pulling the whole housing cover 26 with the fastening and locking device 186.

At the side which is facing the inflow side of the filter housing 12 and facing away from the sleeve section 70, the housing cover 26 comprises an actuating section 72. The housing cover 26 can be actuated at the actuating section 72 for closing or opening.

Moreover, the housing cover 26 may comprise two pressing blades (not shown) for pressing a seal 76 of the filter element 14 against the housing-associated sealing surface 44. The pressing blades are identical and arranged mirror-symmetrical to the longitudinal center plane.

The housing cover 26 is secured in its closing position, as illustrated in the 1 and 2, with a fastening and locking device 186.

The fastening and locking device 186 comprises an eccentric element 187 and a U-shaped bracket element 188 in form of a tensioning spring. The eccentric element 187 is arranged rotatably with respect to a rotation axis 190 on a cross beam 192 of the U-shaped bracket element 188. Two arm sections 206 of the bracket element 188 are connected to a cross beam 192.

The free ends 228 of both arm sections 206 of the bracket element 188 are each attached to the outer sides of the longitudinal walls 48 in a rotatable manner. The free ends 228 of the arm sections 206 each are connected to corresponding bracket reception 230 on opposite sides of the housing body 24.

The bracket element 188 can pivot with respect to a bracket pivot axis 196 such, that the cross beam 192 with the eccentric element 187 is pivotable on the side of the housing body 24 with the installation opening 46. The cross beam 192 of the bracket element 188 can thus be moved by rotating the bracket element 188 to a locking position over the housing cover 26 and to an opening position over the cyclone arrangement 38 so that housing cover 26 can be moved or removed freely to allow access to service the filter element 14. In a closing position, as shown in FIGS. 1 and 2, the eccentric element 187 is engaged with the housing cover 26 and the bracket element 188 grips around the housing cover 26 such, that a part of the housing cover 26 is located between the arm sections 206 of the bracket element 188.

The bracket element 188 is a spring element of an elastic wire of metal. The bracket element 188 can adapt its form dependent on the input of forces during closing and/or opening the fastening and locking device 186.

The eccentric element 187 comprises a handle lever arm 208, a cross beam mounting section in form of two U-shaped slots 202 and an eccentric section 212. The handle lever arm 208 is used as a handle to actuate the fastening and locking device 186 with less effort. With the U-shaped slots 202 the eccentric element 187 is connected to the cross beam 192 of the U-shaped bracket element 188. The U-shaped slots 202 of eccentric element 187 comprise an opening each. Through the openings the cross beam 192 of the bracket element 188 can be inserted into the U-shaped slots 22. By rotating the eccentric section 212 on the cross beam 192 of the bracket element 188 an increasing closing force is applied.

The eccentric section 212 of eccentric element 187 comprises a sliding area 210. With the sliding area 210, the eccentric section 212 can slide along a corresponding area on side of the housing cover 26. The sliding area 210 comprises a number of ribs 214. With the ribs 214 a mechanical friction between the sliding area 210 and the corresponding area on the side of the housing cover 26 is reduced.

The eccentric section 212 of the eccentric element 187 comprises a snap-in area 216. The snap-in area 216 is arranged in closing rotating direction of the eccentric section 212 at the end of sliding area 210 of the eccentric section 212. In this way, the latching can be realized automatically by turning the eccentric element 187 into the closing position. The snap-in area 216 is latched in a closing position in a corresponding area on the side of the housing cover 26. The housing cover 26 has a recess 218 with which the snap-in area 216 of the eccentric element 187 can engage in the closing position. In this way, the eccentric element 187 can be hold in a fixed closing position at the housing cover 26.

The fastening and locking device 186 comprises a retention member 204 as loss protection between the eccentric element 187 and the bracket element 188. With the retention member 204 being prevented, that the eccentric element 187 and bracket element 188 can separate unintentionally. The retention member 204 is arranged on opposite side of the openings of the U-shaped slots 202. In this way it can be prevented, that the cross beam 192 of the bracket element 188 can slip out of the U-shaped slots 202 of the eccentric element 187.

Figure 12:
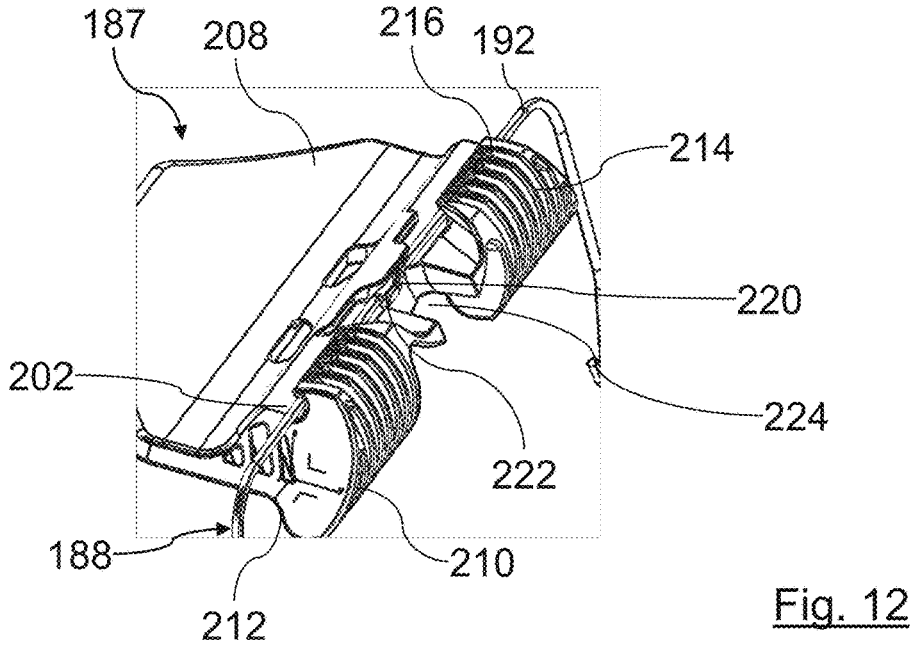
FIG. 12 an enlarged perspective partial view of the fastening and locking device from FIG. 2 in the area of the eccentric element.
Figure 13:
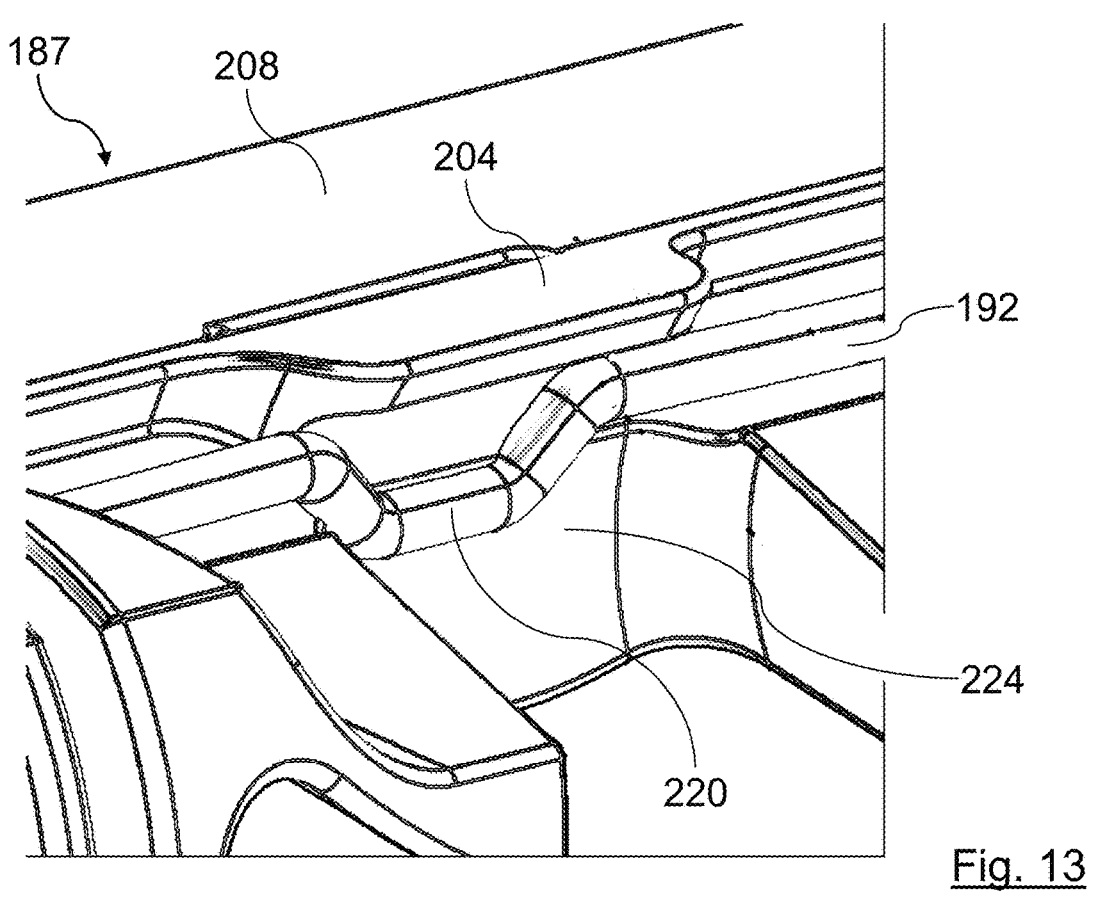
FIG. 13 another enlarged perspective partial view of the fastening and locking device from FIG. 12 in the area of a shifting protection device between the eccentric element and bracket element.
Figure 14:
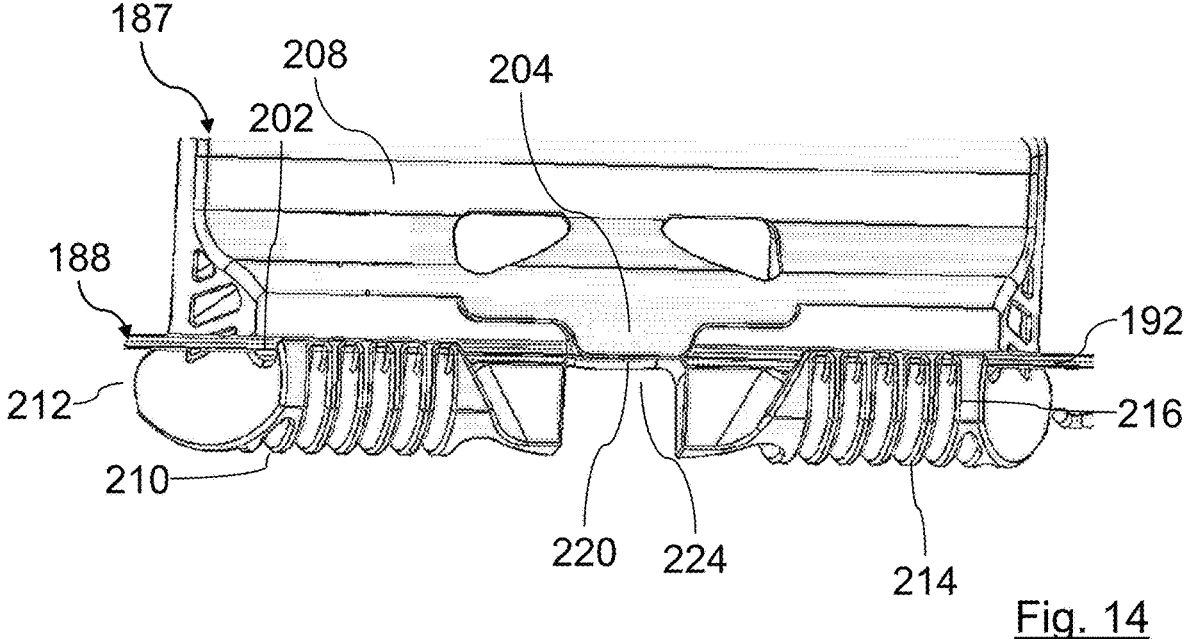
FIG. 14 an enlarged partial top view of the fastening and locking device from FIGS. 12 and 13 in the area of the eccentric element.

The fastening and locking device 186 comprises a shifting protection device 220 between the eccentric element 187 and the bracket element 188. The shifting protection device 220 is shown in FIGS. 12 and 13. With the shifting protection device 220 it can be prevented, that the eccentric element 187 and the bracket element 188 can shift relative to each other.

The shifting protection device 220 comprises a curved section 222 of the cross beam 192 of the bracket element 188. The shifting protection device 220 comprises a recess 224 on the side of the eccentric element 187. The curved section 222 on the side of the cross beam 192 of the bracket element 188 engages in the corresponding recess 224 on the side of the eccentric element 187.

The filter housing comprises a lose prevention device 226 between the fastening and locking device 186 and the housing body 24. The lose prevention device 226 is shown in FIGS. 15 to 18. With the lose prevention device 226 it can be prevented, that the fastening and locking device 186 can detach from the housing body 24 unintentionally.

A part of lose prevention device 226 is realized with the free ends 228 of the arm sections 206 of the bracket element 188 such, that each free end 228 is bent at an angle to a bracket pivot axis 196 of the bracket element 188 on the housing body 24. The free ends 228 each extend over the length of the bent part transverse to the bracket pivot axis 196.

Figure 15:
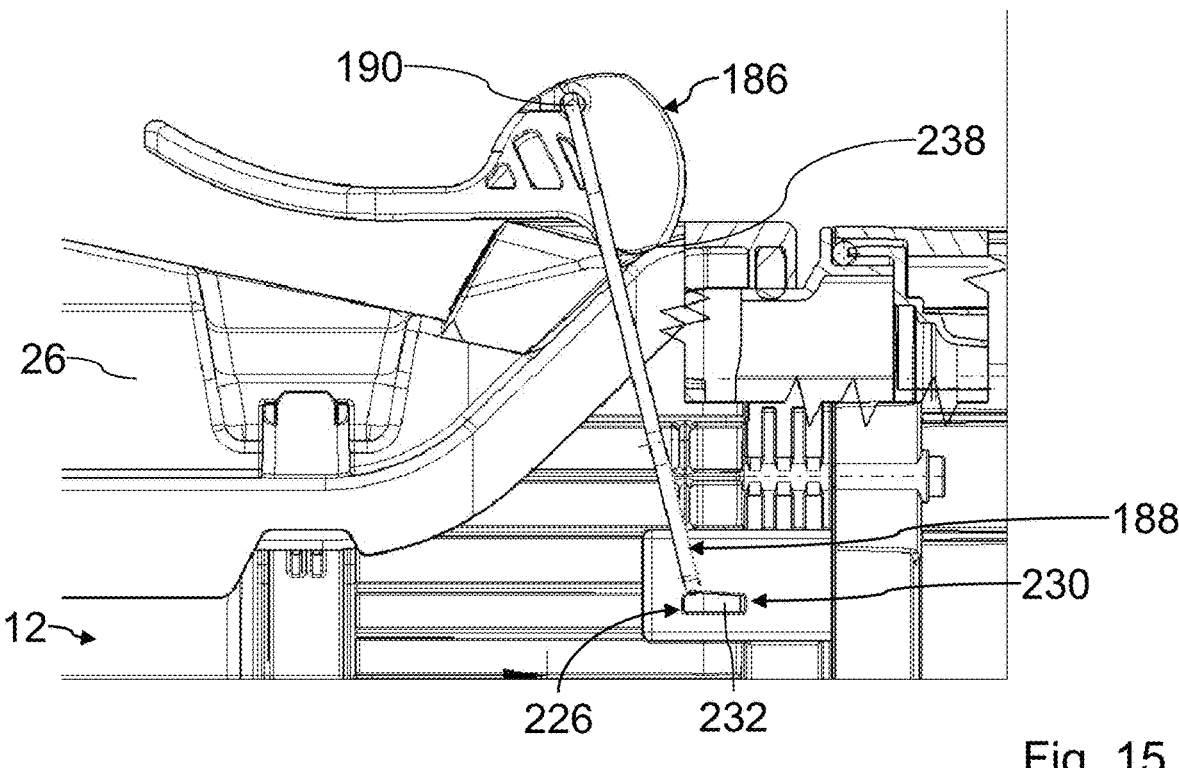
FIG. 15 another enlarged side view of the filter from FIG. 2 in the area of a bracket reception for the bracket element of the fastening and locking device.
Figure 16:
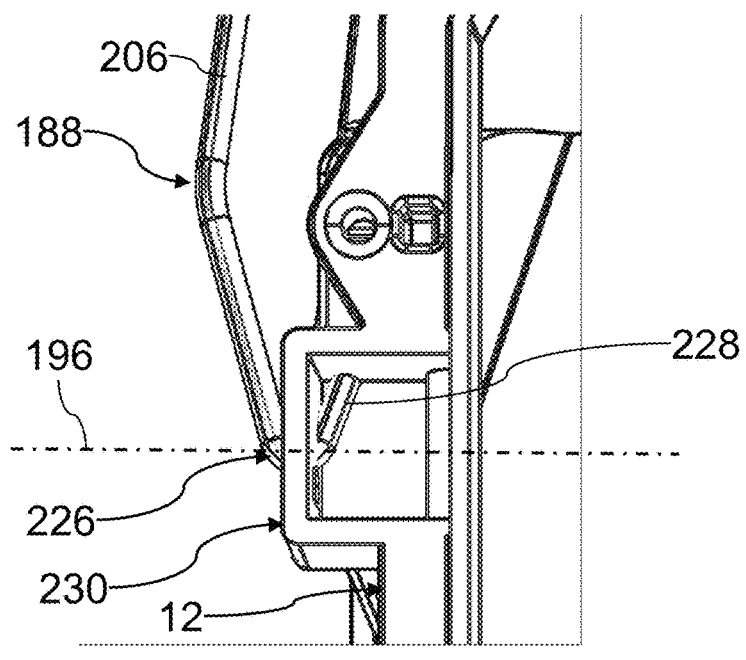
FIG. 16 a longitudinal section through a bracket reception of the filter housing of the filter from FIG. 2 in which a free end of an arm section of the bracket element is inserted.
Figure 17:
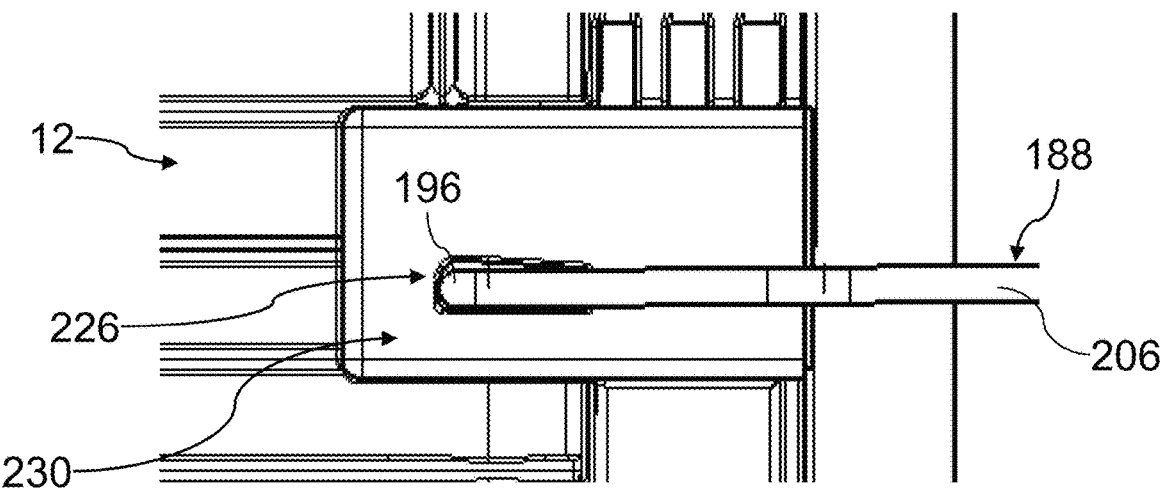
FIG. 17 an enlarged side view of a filter from FIG. 2 in the area of the bracket reception, where the bracket element of the fastening and locking device is in a position in which the free end of the arm section can be inserted into the bracket reception or the free end of the arm section can be withdrawn out of the bracket reception.
Figure 18:
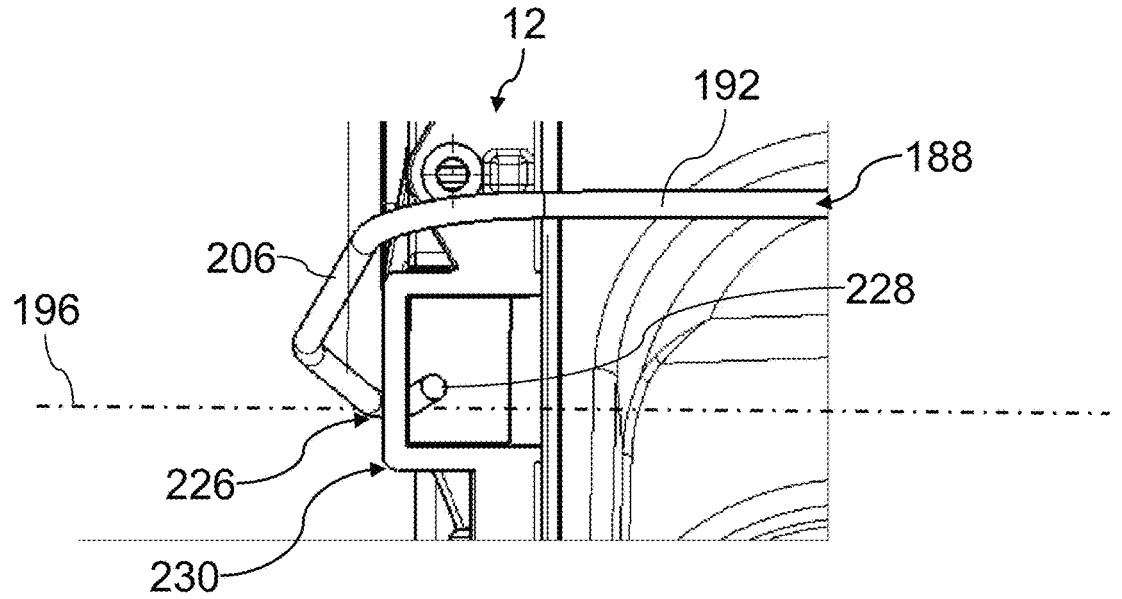
FIG. 18 a longitudinal section through the bracket reception with the bracket element of a fastening locking device.

The bracket receptions 230 of the housing body 24 for the free ends 228 of the arm sections 206 of the bracket element 188 have an elongated insertion opening 232 as another part of the lose prevention device 226. The part of the free ends 228 of arm section 206 of bracket element 188 each which are bent transverse to the bracket pivot axis 196 can be inserted into or withdrawn from the insertion openings 232 of the bracket receptions 230 each only if the bent part of the end of the arm is orientated parallel to the longitudinal direction of the elongated insertion opening 232, as shown in FIGS. 17 and 18. In other orientations of the bracket element 188 relative to the bracket receptions 230 the fastening and locking device 186 is prevented against losing, is shown in FIGS. 15 and 16.

Figure 9:
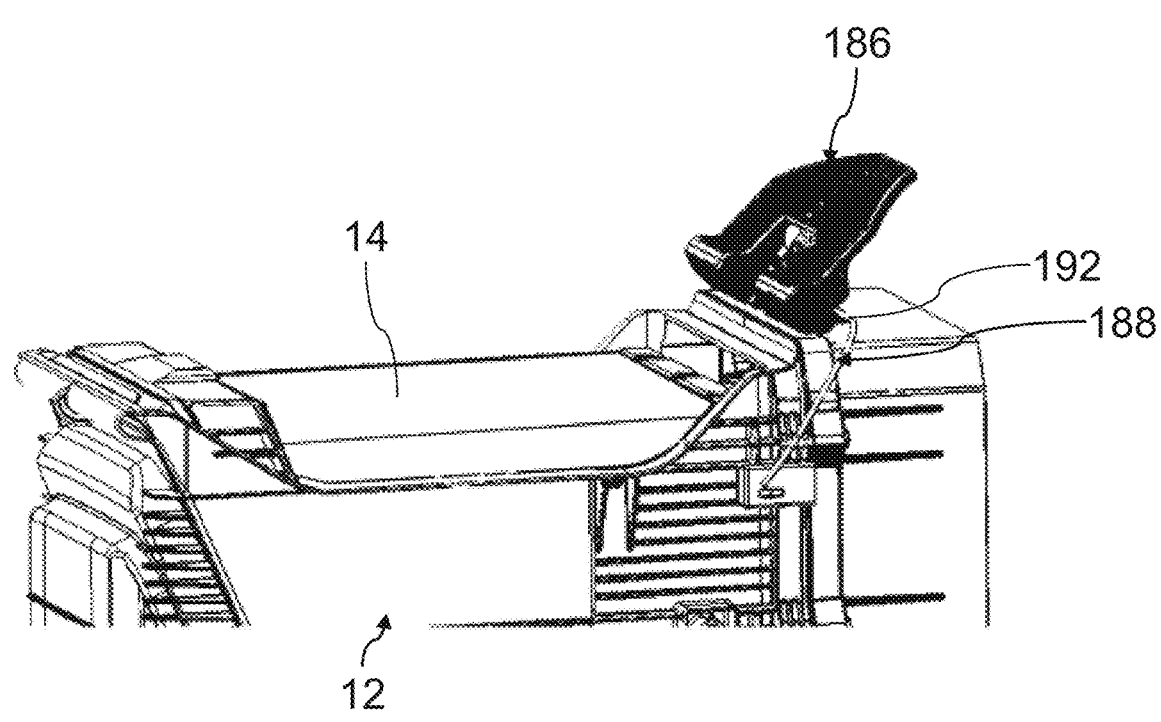
FIG. 9 an enlarged perspective partial view of the air filter from FIG. 1 and two with the fastening and locking device in a fully opening position, wherein the housing cover has been removed and the filter element is now accessible in the filter housing.

The housing cover 26 is attached to the housing body 24 with the pivot connection 54. The pivot connection 54 and the fastening and locking device 186 are on opposite sides of the installation opening 46. The housing cover 26 can be pivoted for giving the installation opening 46 free if the fastening and locking device 186 is in its opening position as shown in FIG. 9.

Figures 4, 5:
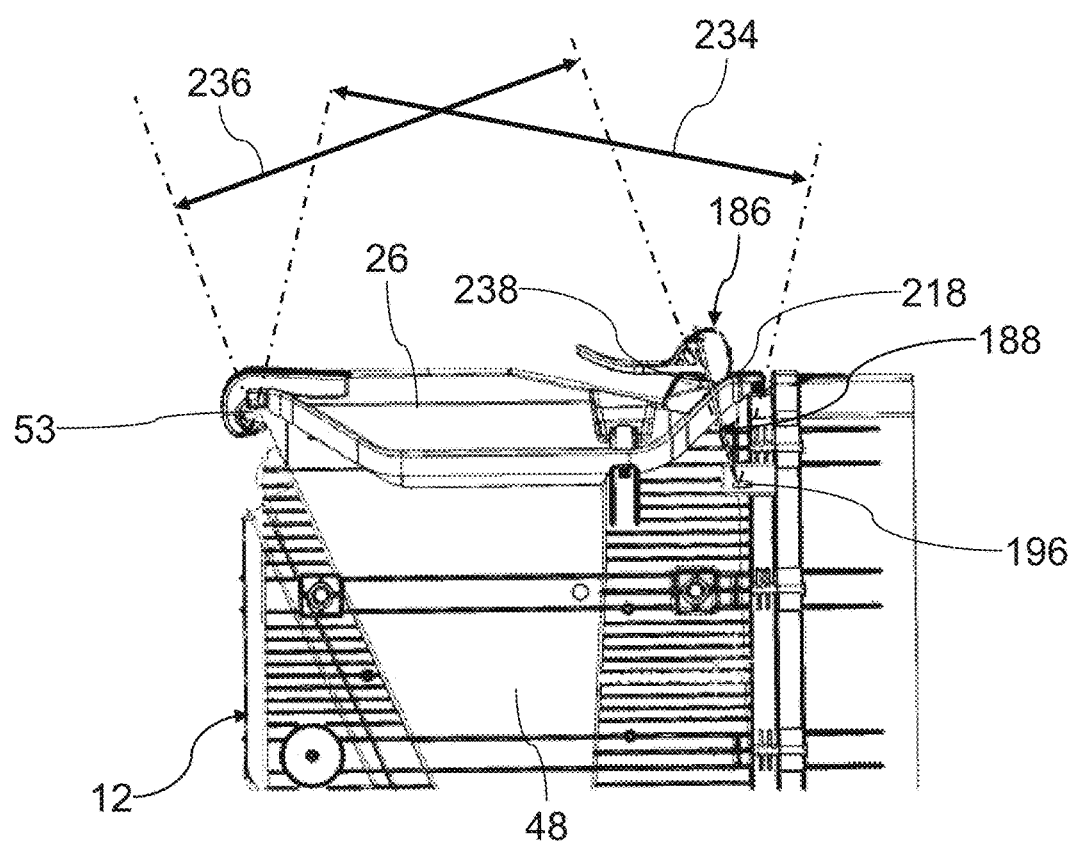
FIG. 4 a side view of the air filter from FIGS. 1 and 2.
FIG. 5 an enlarged perspective partial view of the air filter from FIGS. 1 and 2 in the area of a fastening and locking device.

As shown in FIG. 4, in a closing position a distance 234 between the bracket pivot axis 196 of the bracket element 188 on the housing body 24 and the cover pivot axis 53 of the pivot connection 54 of the housing cover 26 on the housing body 24 is bigger than a distance 236 between a force application area 238, in which the fastening and locking device 186 engages with the housing cover 26 and the cover pivot axis 53. The fastening and locking device 186 pulls the closed housing cover 26 into the pivot connection 54.

FIG. 2 shows a perspective view of an air filter 10 showing the housing cover 26 locked in place by the fastening and locking device 186 with the eccentric element 187 and the U-shaped bracket element 188.

FIG. 3 shows an enlarged partial view of the eccentric element 187 and identifying a rotation axis 190 about which the eccentric element 187 is rotatable on the cross beam 192 of the bracket element 188. As can be seen in FIG. 3, in a preferred configuration, the eccentric element 186 is captured in a two U-shaped slots 202 and may be held in place in the U-shaped slots 202 by a retention member 204 positioned between the U-shaped slots 202. In some embodiments this configuration may be configured to permit removal of the eccentric element 187 from the bracket element 188 when the fastening and locking device 186 is in the open or non-locked position. In other embodiments, the eccentric element 187 is non-removable from the bracket element 188.

FIG. 4 shows a side view showing fastening and locking device 186 with the eccentric element 187 and the bracket element 188, locking the housing cover 26 in a closed/mounted position on the filter housing 12.

FIG. 5 shows the fastening and locking device 186 with the eccentric element 187 movably and rotatably mounted to the filter housing 12 by the U-shaped bracket element 188. The U-shaped bracket element 188 is rotatably attached to the traverse walls 48 of the filter housing 12. The bracket element 188 can also be referred to as a rocking beam or yoke spring.

FIG. 6 shows the fastening and locking device 186 with the eccentric element 187 movably and rotatably mounted to the filter housing 12 by the bracket element 188 and depicts the location of the rotation axis 190 between the eccentric element 187 and the bracket element 188, and a bracket pivot axis 196 between the bracket element 188 and the filter housing 12.

FIG. 7 shows the eccentric element 187 of FIG. 6, now rotated in the opening direction one of 94 about the rotation axis 190 into an opening or non-locked position.

Figure 8:
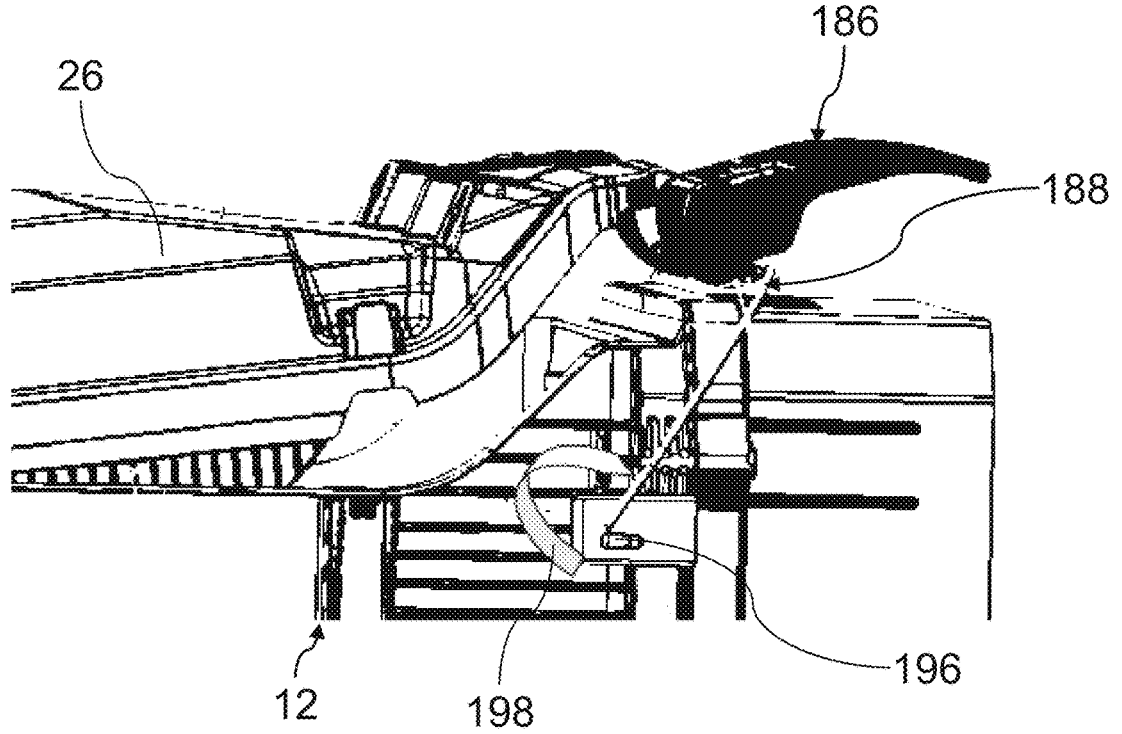
FIG. 8 the enlarged side view of the air filter from FIG. 7, now the fastening and locking device further provided in an opening direction about a pivot axis of the bracket element, moving the eccentric element into a final opening position in which the housing cover is unlocked and is ready to be removed from the filter housing.

FIG. 8 shows the eccentric element 187 of FIG. 7, now further rotated in an opening direction 198 about the second rotation axis 196 of the bracket element 188, moving the fastening locking device hundred 86 into a final opening position in which the housing cover 26 is unlocked and is ready to be removed from the filter housing 12.

FIG. 9 shows the fastening locking device 186 in in a fully opening position. The housing cover 26 has been removed and the filter element 14 is now accessible in the filter housing, such that the filter element 14 may be removed or replaced during servicing.

Figure 10:
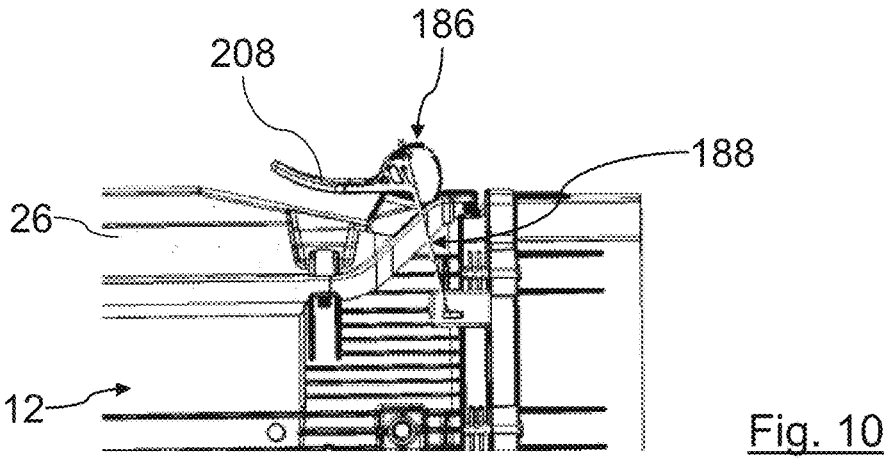
FIG. 10 another enlarged side view of the filter from FIGS. 1 and 2 with the fastening and locking device in a closing position where a handle lever arm of the eccentric element pointing to a pivot connection of the housing cover to the filter housing.

FIG. 10 shows another enlarged side view of the filter 10 from FIGS. 1 and 2 with the fastening and locking device 186 in a closing position where in a first mounting position of the eccentric element 1 and 87 a handle lever arm 208 of the eccentric element 187 pointing to the pivot connection 54 of the housing cover 26 to the housing body 24.

Figure 11:
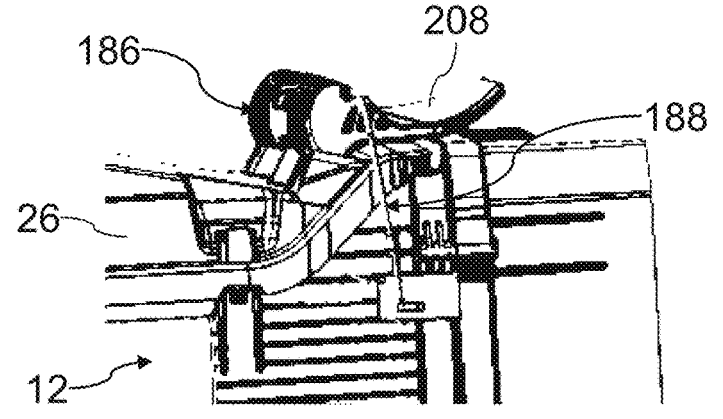
FIG. 11 an enlarged side view of the filter from FIG. 10 with the fastening and locking device in a second mounting option where in a closing position the handle lever arm of the eccentric element pointing away from the pivot connection of the housing cover to the filter housing.

FIG. 11 shows the eccentric element 187 in a second mounting position with the handle lever arm 208 of the eccentric element 187 pointing away from the pivot connection 54 to the right towards the cyclone arrangement 38 in the closing position of the fastening locking device 186.

The filter element 14 comprises a filter bellows 88 and may comprise a frame element circumferentially surrounding the filter bellows 88. The filter bellows 88 may be inserted into and may be fixed into an element frame. The filter bellows 88 comprises a zigzag-shaped folded filter medium 92. The filter bellows 88 is may be rectangular viewed in the direction of the main axis 16. Viewed in the direction of the transverse axis 20, the filter bellows 88 may have approximately the shape of a right angle trapezoid. An inflow side 94 of the filter bellows 88 extends parallel to the flow center plane, thus perpendicular to the main axis 16. An outflow side 96 extends parallel to the transverse axis 20 and at a slant to the flow center plane, thus at a slant to the inflow side 94.

The filter bellows 88 may taper, viewed in installation direction 22, toward its forward transverse side. The fold edges of the filter medium 92 at the inflow side 94 and the outflow side 96 extend each parallel to the transverse axis 20. The fold edges define the inflow surface at the inflow side 94 and the outflow surface at the outflow side 96, respectively. The heights of the folds of the folded filter medium 92 in the direction of the main axis 16 may decrease from the transverse side of the filter bellows 88 that is rearward relative to the installation direction 22 toward its forward transverse side. The filter bellows 18 may thus have variable fold heights.

The outflow side 96 is surrounded by the seal 76. The seal 76 is made of polyurethane. It is elastic. The seal 76 is may be foamed onto the end face of the filter medium 92. The seal 76 may project past the filter medium 92 relative to the main axis 16 radially in outward direction and in axial direction. An outflow-associated end face sealing lip of the seal 76 forms a sealing surface 98 which is continuous circumferentially relative to the main axis 16. The sealing surface 98 in the installed state is resting against the housing-associated sealing surface 44.

At the rear side of the seal 76, which is facing away from the sealing surface 98 relative to the main axis 16, a reinforcement frame 100 of plastic material may be provided and embedded in the sealing bead of the seal 76. The reinforcement frame 100 may extend parallel to the sealing plane 44 and parallel to the sealing surface 98. The reinforcement frame 100 is preferentially continuous circumferentially relative to the main axis 16. A sealing rear side 102 of the seal 76, which is facing away axially from the sealing surface 98 relative to the main axis 16, may extend in a plane parallel to the plane of the sealing surface 98. With installed filter element 14, the respective planes of the sealing surface 98 and of the sealing rear side 102 preferably extend parallel to the sealing plane 45 of the housing-associated sealing surface 44.

Moreover, an edge protection 104 may be provided and fastened at the inflow side 94 of the filter bellows 88. The edge protection 104 may comprise polyurethane and foamed onto the filter medium 92. The edge protection 104 may extend continuously circumferentially relative to the main axis 16 along the inflow-associated rim of the filter bellows 88. The edge protection 104 projects past the filter medium 92 relative to the main axis 16 in axial direction.

The fastening locking device 186 may be configured to lock the housing cover 26 on the filter housing 12 in at least one of two different mounting options. FIG. 10 shows a first mounting option where the fastening locking device 186 in a first mounting option with the handle lever arm 208 of the eccentric element 187 pointing to the pivot connection 54 in the closing position.

FIG. 11 shows a second mounting option for the fastening and locking device 187 with the handle lever arm 208 of the eccentric element 187 pointing away from the pivot connection 54 to the right towards the cyclone arrangement 38 in the closing position.

The disclosed configuration of the bracket element 187 and bracket element 188 to mount the housing cover 26 has several advantages. The fastening and locking device 186 advantageously provides for one handed operation of the fastening and locking device 186 from the top of the air filter 10 or air filter system. This being the case, the lateral sides or traverse walls 50 of the filter housing 12 may be fully covered, obstructed or blocked by other components, without blocking or preventing service to the air filter 10.

Another advantage is that several air filters 10 may therefore be mounted directly side by side, as shown in FIG. 19, thereby providing a compact space-spacing configuration for applications requiring more than one air filter 10.

Another advantage, as shown in FIG. 20, is that the one handed operation of the fastening locking device 186 at the top of the housing cover 26 allows for air filter element service/replacement in tight spaces that otherwise may be difficult or essentially impossible to reach by service personnel. FIG. 20 shows how the air filter 10 may service from the top through a maintenance opening 300 in a vehicle or machine.

The invention claimed is:

1. A filter housing comprising
   a housing body comprising at least one openable installation opening, at least one inlet opening for a fluid to be cleaned, and at least one outlet opening for a cleaned fluid, at least one housing cover configured to close the at least one openable installation opening, and at least one fastening and/or locking device configured to secure the at least one housing cover in a closed position,
   wherein the housing body comprises an element receptacle configured to receive, through the at least one openable installation opening, at least one filter element, wherein the at least one filter element, when installed in the element receptacle, separates the at least one inlet opening from the at least one outlet opening,
   wherein the at least one openable installation opening is arranged in a transverse side of the housing body and the transverse side is lateral relative to a housing axis of the filter housing,
   wherein the housing body comprises at least one sealing surface for contact of at least one seal of the at least one filter element, wherein the at least one sealing surface surrounds the housing axis at least partially circumferentially, wherein at least one fastening and/or locking device has at least one U-shaped bracket element, with arm sections connected to a cross beam, and at least one eccentric element which is mounted rotatable with respect to a rotation axis on the cross beam,
   wherein free ends of the arm sections of the at least one bracket element each are connected to at least one corresponding bracket reception on opposite sides of the housing body such; that the at least one bracket element can pivot with respect to a bracket pivot axis and such that the cross beam with the at least one eccentric element is pivotable on the transverse side of the housing body with the at least one installation opening, and
   wherein in the closed position the at least one eccentric element is engaged with the at least one housing cover and the at least one bracket element grips around the housing cover such, that a part of the housing cover is located between the arm sections of the bracket element.

2. The filter housing according to claim 1, wherein the at least one bracket element is at least partly elastic.

3. The filter housing according to claim 1, wherein the at least one eccentric element comprises at least one lever arm, at least one cross beam mounting section and at least one eccentric section.

4. The filter housing according to claim 3, wherein the at least one eccentric section of the at least one eccentric element comprises at least one sliding area.

5. The filter housing according to claim 3, wherein the at least one eccentric section of the at least one eccentric element comprises at least one snap-in area.

6. The filter housing according to claim 1, wherein the at least one housing cover has at least one recess with which at least a part of the eccentric element can engage in the closed position.

7. The filter housing according to claim 1, wherein the at least one fastening and/or locking device comprises at least one retention member as loss protection between the at least one eccentric element and the at least one bracket element.

8. The filter housing according to claim 1, wherein the at least one fastening and/or locking device comprises at least one shifting protection device between the at least one eccentric element and the at least one bracket element.

9. The filter housing according to claim 1, further comprising at least one loss prevention device between the fastening and/or locking device and the housing body.

10. The filter housing according to claim 1, wherein the at least one housing cover is attached to the housing body with at least one pivot connection, and wherein the pivot connection and the at least one fastening and/or locking device are on opposite sides of the at least one installation opening.

11. The filter housing according to claim 10, wherein in the closed position a distance between the bracket pivot axis of the at least one bracket element on the housing body and a cover pivot axis of the pivot connection of the at least one housing cover on the housing body is bigger than a distance between a force application area, in which the at least one fastening and/or locking device engages with the at least one housing cover and the cover pivot axis.

12. A filter for a fluid; comprising at least one filter element that is arranged exchangeable in the filter housing according to claim 1.

* * * * *